(12) United States Patent
Allan

(10) Patent No.: US 9,768,714 B2
(45) Date of Patent: Sep. 19, 2017

(54) ELECTRIC DRIVE SYSTEM

(71) Applicant: Harper Adams University, Newport Shropshire (GB)

(72) Inventor: David Grant Allan, Newport (GB)

(73) Assignee: Harper Adams University, Newport Shropshire (GB)

( * ) Notice: Subject to any disclaimer, the term of this patent is extended or adjusted under 35 U.S.C. 154(b) by 63 days.

(21) Appl. No.: 14/769,535

(22) PCT Filed: Feb. 5, 2014

(86) PCT No.: PCT/GB2014/050319
§ 371 (c)(1),
(2) Date: Aug. 21, 2015

(87) PCT Pub. No.: WO2014/128433
PCT Pub. Date: Aug. 28, 2014

(65) Prior Publication Data
US 2016/0006378 A1 Jan. 7, 2016

(30) Foreign Application Priority Data
Feb. 22, 2013 (GB) .................... 1303173.7

(51) Int. Cl.
*H02P 29/00* (2016.01)
*H02P 5/695* (2006.01)
(Continued)

(52) U.S. Cl.
CPC ............ *H02P 5/695* (2013.01); *B60L 3/0046* (2013.01); *B60L 3/04* (2013.01); *B60L 3/106* (2013.01);
(Continued)

(58) Field of Classification Search
CPC ...... B60L 15/2054; B60L 15/20; B60L 15/32; H02P 5/747; H02P 5/69; H02P 5/695; H02P 5/74
(Continued)

(56) References Cited

U.S. PATENT DOCUMENTS

| 3,559,008 A | 1/1971 | Stut et al. |
| 5,134,346 A | 7/1992 | Schneider et al. |

(Continued)

FOREIGN PATENT DOCUMENTS

| EP | 0286585 A1 | 10/1988 |
| EP | 1262687 A2 | 12/2002 |
| GB | 1180500 | 2/1970 |

OTHER PUBLICATIONS

International Searcing Authority, International Search Report, Jul. 3, 2015, 3 pages.
UK Patent Office, Search Report, Aug. 7, 2013, 2 pages.

*Primary Examiner* — Bentsu Ro
*Assistant Examiner* — Thai Dinh
(74) *Attorney, Agent, or Firm* — Holzer Patel Drennan

(57) ABSTRACT

This invention concerns an electric drive system (200) for driving an output. The electric drive system comprises: a first electric motor (250) arranged to drive a first input shaft (230) at a first angular velocity, $\omega_1$, and a second electric motor (260) arranged to drive a second input shaft (240) at a second angular velocity, $\omega_2$. A gear mechanism (210) is provided and is arranged to transmit angular rotation of the first (230) and second (240) input shafts to drive the output (220) at an output angular velocity, $\omega_{out}$, such that $\omega_{out}$ is proportional to $a\omega_1 - b\omega_2$, where a and b are constants. The electric drive system (200) further comprises a controller (270) arranged to control operation of the first (250) and second (260) electric motors. When the output (220) is to be driven from $\omega_{out}=0$, the controller (270) is arranged to (Continued)

control the first (250) and second (260) electric motors to drive the first (230) and second (240) input shafts. The input shafts are driven in a first phase to primary first and second angular velocities, $\omega_{1,p}$ and $\omega_{2,p}$, such that $a\omega_{1,p} \approx b\omega_{2,p}$. The input shafts are also subsequently driven in a second phase in which the first angular velocity, $\omega_1$, or the second angular velocity, $\omega_2$, or both are varied such that $a\omega_1 \neq b\omega_2$ and the output is driven from $\omega_{out}=0$. The result of this is that the motors run in a more efficient part of their output profile, even whilst the vehicle is at rest, pulling off (especially in situations of high output load such as on off-road or otherwise difficult terrain), or moving at low velocity.

16 Claims, 12 Drawing Sheets

(51) Int. Cl.

| | | |
|---|---|---|
| *H02P 5/69* | (2006.01) | |
| *H02K 7/116* | (2006.01) | |
| *H02K 16/00* | (2006.01) | |
| *B60L 3/00* | (2006.01) | |
| *B60L 3/04* | (2006.01) | |
| *B60L 3/10* | (2006.01) | |
| *B60L 15/20* | (2006.01) | |
| *B60L 15/32* | (2006.01) | |

(52) U.S. Cl.
CPC .......... *B60L 15/2036* (2013.01); *B60L 15/32* (2013.01); *H02K 7/116* (2013.01); *H02K 16/00* (2013.01); *H02P 5/69* (2013.01); *B60L 2200/26* (2013.01); *B60L 2220/42* (2013.01); *B60L 2240/12* (2013.01); *B60L 2240/421* (2013.01); *B60L 2240/423* (2013.01); *B60L 2240/465* (2013.01); *B60L 2240/545* (2013.01); *B60L 2260/28* (2013.01); *Y02T 10/641* (2013.01); *Y02T 10/645* (2013.01); *Y02T 10/648* (2013.01); *Y02T 10/72* (2013.01); *Y02T 10/7275* (2013.01)

(58) Field of Classification Search
USPC ................. 318/8, 9, 11, 12, 13, 568.18, 625
See application file for complete search history.

(56) References Cited

U.S. PATENT DOCUMENTS

| | | | | |
|---|---|---|---|---|
| 5,331,266 | A | 7/1994 | Widmann et al. | |
| 5,662,188 | A * | 9/1997 | Ito | B62D 5/07 |
| | | | | 184/11.1 |
| 8,167,063 | B2 * | 5/2012 | Abe | B60W 10/08 |
| | | | | 180/65.24 |
| 8,622,859 | B2 * | 1/2014 | Babbitt | B60K 6/12 |
| | | | | 475/1 |
| 8,672,065 | B2 * | 3/2014 | Beck | B60K 7/0007 |
| | | | | 180/24 |
| 9,365,105 | B2 * | 6/2016 | Tesar | F16D 13/26 |
| 2002/0193197 | A1 * | 12/2002 | Weisz | B60K 6/445 |
| | | | | 475/5 |
| 2005/0023052 | A1 * | 2/2005 | Beck | B60K 7/0007 |
| | | | | 180/24.07 |
| 2006/0289212 | A1 * | 12/2006 | Haruhisa | B60K 6/445 |
| | | | | 180/65.235 |
| 2009/0167231 | A1 * | 7/2009 | Sussmeier | H02P 5/695 |
| | | | | 318/610 |
| 2011/0243549 | A1 | 10/2011 | Yokoyama | |
| 2011/0281679 | A1 * | 11/2011 | Larrabee | B64C 39/024 |
| | | | | 475/5 |
| 2013/0211686 | A1 * | 8/2013 | Shono | B60K 6/445 |
| | | | | 701/70 |
| 2014/0183996 | A1 * | 7/2014 | He | H02K 49/102 |
| | | | | 310/74 |

\* cited by examiner

Figure. 18

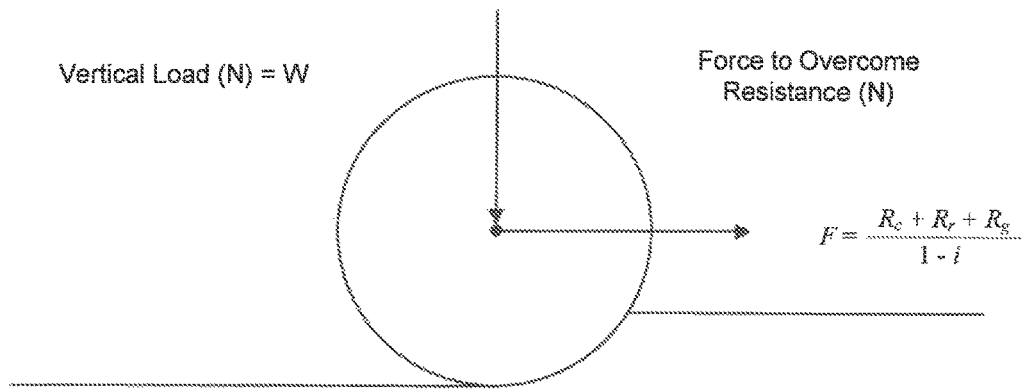

$$R_c = \left[ \cfrac{3W \left[\cfrac{Z_r^{n+1}}{n+1}\right]}{Z_r^{\frac{(2n+1)}{2}}(3-n)\sqrt{D}} \right]$$

$R_r = WC_{rr}$ $R_g = W \sin \Theta$

Where:

$R_c$ = Sinkage Resistance (N)
$R_r$ = Rolling Resistance (N)
$R_g$ = Gradient Resistance (N)
$i$ = Slip (%)
$Z_r$ = Wheel Sinkage (m)
$n$ = Bekker Sinkage Constant
$D$ = Wheel Diameter (m)
$C_{rr}$ = Coefficient of Rolling Resistance
$\Theta$ = Gradient of Slope (degrees)

ELECTRIC DRIVE SYSTEM

PRIORITY CLAIM

The present application is a U.S. 371 National Phase Patent Application and claims benefit of Patent Cooperation Treaty application No. PCT/GB2014/050319, entitled "ELECTRIC DRIVE SYSTEM" and filed on 5 Feb. 2014, which takes priority from U.K. Patent Application 1303173.7 filed on 22 Feb. 2013, all of which are incorporated herein by reference in their entirety.

This invention relates to an electric drive system for driving an output for use with electric motors. In particular, the invention relates to an off-road vehicle having such an electric drive system.

A typical DC electric motor has an output shaft, which rotates at an angular velocity, or rotation speed, $\omega$. The output shaft has a torque, T, and provides power P.

FIG. 1 schematically shows the relationship between the rotation speed, $\omega$, of the output shaft of a typical DC electric motor, the output torque, T, and output power, P.

In FIG. 1 and FIG. 2, plots of torque, T, against angular velocity, $\omega$, are provided and the following labels are used:

Zone A: Low efficiency zone of operation: 0-50%;
Zone B: High efficiency zone of operation: 50-90%;
Zone C: Optimum efficiency zone of operation: 90-95%; and
Line 3: Capped continuous torque.

The maximum torque is at the stall torque, $T_S$, which is when the output shaft of the motor is not rotating i.e. when $\omega=0$. The torque produced by the motor is approximately inversely proportional to the shaft rotation speed or angular velocity $\omega$. The maximum angular velocity, $\omega_{max}$, occurs at zero torque, i.e. when no load is applied to the output shaft. The power provided by the motor is related to the product of the angular velocity and the torque, and is represented by the parabolic relationship shown in FIG. 1. The power is zero when the rotation speed is zero and also when it is at its maximum, $\omega_{max}$. The maximum power occurs at $\omega_{max}/2$ and $T_S/2$ since a linear inverse relationship between T and $\omega$ is assumed.

In typical use an electric motor will start at rest, its angular output speed is zero, $\omega=0$, and so will operate around the stall torque. The amount of torque is proportional to the amount of current the motor can draw, so in order to provide a large torque at zero angular velocity, the current drawn by the motor will be high. The available current will be limited by the power source, as shown in FIG. 1, such as the battery supplying the current, or the amount of current the circuitry is able to handle without overheating. Typically the circuitry delivering the current will have a cut-off to avoid damage from overheating.

If the current is not adequate to provide enough torque to the motor it will not be able to drive the applied load and it will stall. If the motor is powering a vehicle, which is moving from rest, the motor will stall and the vehicle will be unable to move. This can especially be a problem in situations where high levels of torque are required, at low speed where the vehicle is not assisted by momentum, such as on undulating terrain or unprepared terrain in off-road conditions, or when driving up a step or kerb or other similar obstacle. Off-road, agricultural and construction vehicles often operate at low speed and with high loads on unprepared terrain, so these considerations are particular applicable.

This increased loading can be explained in part by the effects of rolling resistance, sinkage and slip of each vehicle wheel during traverse of unprepared terrain. The force required to overcome resistance on the wheel of a vehicle accelerating from rest can be found in FIG. 18.

For example, in a measured experiment a typical all-terrain 4WD vehicle of 2000 kg was operated on concrete and cultivated soil. The total torque required for operation of all 4 wheels was measured as 2786 Nm for cultivated soil and only 126 Nm for flat concrete. This experiment demonstrates that the vehicle torque requirements can be easily 20 times that required on prepared terrain.

Typical solutions to this problem are adapted from well-known solutions to the corresponding problem found in other forms of motor such as petrol or diesel engines. In that field it is well known to use a clutch system to disengage the drive to control the output at low vehicle speeds. This adds additional weight and complication over a direct drive system, but is still accepted as a good solution. Flywheels may also be used to minimise the chance of the motor stalling at low speeds. This requires the addition of a large and heavy flywheel, but is still accepted as a good solution and has been used for many years. It is also known to incorporate speed reduction gearing either in the transmission or at the output wheels to reduce the angular velocity of the output of the drive and increase the applied torque at the wheels. This avoids operating the motor at low speed when the vehicle speed is low, but the speed reduction gearing will limit the overall maximum speed of the vehicle, and adds additional heavy gearing to the vehicle.

The inventor has realised that electric traction motors can be very efficient. However, when moving from rest, stopping and starting, or travelling at low speed, direct drive and gear assisted electrically powered vehicles will operate with the motor angular velocity$\approx$0, and this particular zone of operation is significantly inefficient. In consequence when operating at low speeds or with a stop-start duty cycle, the inefficiency will have a direct and significant effect on vehicle range and performance (such as pulling-off on unprepared or rough terrain).

Motor efficiency is inversely related to the total amount of power losses in the motor.

Motor losses are often divided into two major areas: conduction losses and speed-related losses. One function of this invention is to mitigate against losses in efficiency and effectiveness in the drive system of vehicles operating at near zero speed ($\omega\approx0$) and the inventor has considered management of low speed efficiency losses. The primary cause of low speed motor efficiency is conduction loss. Conduction losses are the result of the motor drive current flowing in the motor coils with a finite resistance. These losses are related to the motor current squared times the motor resistance ($I^2R$).

When the speed of the motor is controlled through variation of the voltage the torque at the output shaft will be proportional to the current. Therefore as the speed and torque are inversely proportional when operated at low speeds the motor will draw high current; due to the resistance of the windings and other supply components the proportion of energy lost to waste heat will be significant. As a direct consequence of this waste heat loss most typical electric motors will demonstrate an efficiency of 30-50% at near zero speed ($\omega\approx0$).

In FIG. 2, $T_m$ denotes the maximum torque available at start-up. As shown in FIG. 2, a typical direct drive motor will, at zero angular velocity, only provide 40-50% of the available rated power of the motor and so the vehicle will require a motor which has twice the torque required to compensate for the conduction loss inefficiency of the motor at near-zero speeds. If a vehicle is required to pull-off on unprepared terrain, the torque required will be 20 times that required for steady state operation at $\omega_{max}/2$ on hard ground. The majority of off-highway vehicles regularly operate in a short duty cycle having a high number of stops and starts.

The present invention provides a drive system that recognises and solves the problem of requiring a high current at low output angular velocities and provides a drive system that is less prone to stalling and more efficient when running at low speeds.

The present invention provides an electric drive system for driving an output comprising: a first electric motor arranged to drive a first input shaft at a first angular velocity, $\omega_1$, a second electric motor arranged to drive a second input shaft at a second angular velocity, $\omega_2$, a gear mechanism arranged to transmit angular rotation of the first and second input shafts to drive the output at an output angular velocity, $\omega_{out}$, such that $\omega_{out}$ is proportional to $a\omega_1-b\omega_2$, where a and b are constants and a controller is arranged to control operation of the first and second electric motors. When the output is to be driven from $\omega_{out}=0$, the controller is arranged to control the first and second electric motors to drive the first and second input shafts: in a first phase to primary first and second angular velocities, $\omega_{1,p}$ and $\omega_{2,p}$, such that $a\omega_{1,p} \approx b\omega_{2,p}$ and in a second phase subsequently to vary the first angular velocity, $\omega_1$, or the second angular velocity, $\omega_2$, or both such that $a\omega_1 \neq b\omega_2$ and the output is driven from $\omega_{out}=0$.

The output of the drive system is therefore zero, whilst the first and second electric motors run at non-zero angular velocities. When the output is required to be driven from $\omega_{out}=0$, i.e. when the vehicle pulls away from rest, the first, and/or the second, electric motor angular velocity is varied such that they no longer cancel out, and the output is accordingly non-zero. This means the electric motors do not run at low angular velocity where the torque is high and a large current is drawn. The result of this is that the motors run in a more efficient part of their output profile, even whilst the vehicle is at rest, pulling off (especially in situations of high output load such as on off-road or otherwise difficult terrain), or moving at low velocity. Consequently the vehicle can utilise smaller motors and the performance and range of the vehicle is therefore improved.

The controller may be arranged to control the first and second electric motors to drive the first and second input shafts to primary first and second angular velocities such that $a\omega_{1,p}=b\omega_{2,p}$. The angular velocities of the first and second electric motors may be controlled so that they cancel each other out and the output velocity is zero. The velocity of the first and second input drive shafts at which the output velocity is zero may depend on the gear ratios within the gear mechanism, the gear ratios determining the values of a and b.

Each of the primary first and second angular velocities is substantially non-zero, such as greater than 10% of $\omega_{max}$, where $\omega_{max}$ is the maximum angular velocity of each motor and input shaft pair. This means that when running at the primary first and second angular velocities the first and second electric motors run in an efficient region of their output profile.

Each of the primary first and second angular velocities is between 20% and 80% of $\omega_{max}$. Some electric motors may have an increased efficiency in the region of 20% to 80% of their maximum output velocity.

The controller is arranged to control the rate of rotation of the first and second motors in response to user input. The user may be provided with an input means to control the output angular velocity of the drive system by varying the angular velocity of the first and second motors.

The electric drive system may further comprise a sensing system arranged to measure $\omega_1$ and $\omega_2$ and to communicate the measurements to the controller, such that in the first phase the controller is arranged to control the first, second or both electric motors so that that $a\omega_1$ and $b\omega_2$ are bought closer to being equal. This means the values of $a\omega_1$ and $b\omega_2$ can be controlled so that the angular velocity of the output is zero and the vehicle will remain at rest during the first phase.

The controller may be arranged to determine whether $a\omega_1=b\omega_2$, and if it is determined that $a\omega_1 \neq b\omega_2$, the controller being further arranged to control the first, second or both electric motors so that $a\omega_1$ and $b\omega_2$ are brought closer to being equal. This allows the controller to maintain the values of $a\omega_1$ and $b\omega_2$ such that the output angular velocity is zero.

The sensing system may comprise a first sensor arranged to measure $\omega_1$ and a second sensor to measure $\omega_2$. This allows the controller to monitor the angular velocity of the first and second input shafts so that the velocity of the first and second motors can be controlled.

The electric drive system may further comprise a third sensor arranged to measure $\omega_{out}$ and communicate its value to the controller, in the first phase the controller being arranged to control the first, second or both electric motors so that $a\omega_1$ and $b\omega_2$ are brought closer to being equal. The first and second electric motors can be controlled in response to the output angular velocity so that the output velocity remains at zero during the first phase, or is at the desired velocity to drive the vehicle in the second phase.

The gear mechanism may comprise a lubrication system arranged to operate under unusually high centrifugal forces. When running in a region of their output profile that is efficient, the first and second electric motors may run at angular velocities around, or in excess of, half of their maximum output, even whilst the output angular velocity is zero. This produces great centrifugal forces within the gear mechanism that can force the lubricant in an outward radial direction from the axis of rotation, resulting in the lubricant being forced away from the centre, and becoming insufficiently distributed throughout the components of the gear mechanism.

The lubrication system may comprise a deflector, machined feature or a bearing surface arranged to direct lubricant. The deflector, bearing surface or machined features may be arranged to direction lubricant to: the star gear and carrier contact area; the teeth of the star gear; the mounting spindles and sides of the inner planet gears; the sides and teeth of the outer planet gears; or to the ring gear of the gear mechanism. The first, second or both input shafts may comprise sealed and pre-lubricated roller bearings. This ensures that the lubricant is distributed evenly throughout the gear mechanism and is not pulled away from the centre of rotation by the increased centrifugal force experienced by the gear mechanism. If the components towards the axis of rotation are not sufficiently lubricated they may experience excess wear, become damaged and fail.

The gear mechanism may be an epicyclic gear system. The drive may be transmitted from the first and second input shafts to the output shaft using a system of star, planet and ring gears in an epicyclic layout. This allows the first and second input rotations to effectively be cancelled out and provide an output at rest whilst the first and second input angular velocities are non-zero.

The present invention further provides a vehicle comprising the electric drive system of the present invention.

The vehicle may be an off-road vehicle. The electric drive system of the present invention is particularly suited to use in an off-road vehicle because of the increased torque required for the vehicle to pull away from rest on unprepared or rough terrain.

The present invention further comprises a vehicle wheel comprising an electric drive system of the present invention mounted thereon. The drive system described above may be connected directly (or indirectly) to the wheel of a vehicle in order to power the vehicle.

The present invention may provide an electric drive system for driving an output comprising: a first electric motor arranged to drive a first input shaft at a first angular velocity, a second electric motor arranged to drive a second input shaft at a second angular velocity, a gear mechanism arranged to transmit angular rotation of the first and second input shafts to drive the output shaft at an output angular velocity, wherein the first and second shafts are arranged to work against one another so that when they are at an equal angular velocity the output shaft is at rest; a controller arranged to control operation of the first and second electric motors, such that when the output shaft is to be driven from rest, the controller is arranged to control the first and second electric motors to drive the first and second input shafts to a predefined optimum angular velocity, whilst they are still working against one another, and then vary the angular velocity of the first input shaft, the second input shaft or both such that they no longer work completely against one another and the output is driven from rest.

The predefined optimum angular velocity of the first and second motor may be a velocity in a high efficiency region. The region of high efficiency angular velocities may be between 20% and 80% of $\omega_{max}$, between 40% and 80% of $\omega_{max}$ or between 40% and 60% of $\omega_{max}$. The predefined optimum angular velocity may be where the power output is greatest. The predefined optimum angular velocity may be at, or in excess of, $\omega_{max}/2$.

Embodiments of the invention will now be described, by way of example only, with reference to the accompanying drawings, in which.

FIG. 18 discloses an equation of the force required to overcome resistance on the wheel of a vehicle accelerating from rest.

Figure 3:
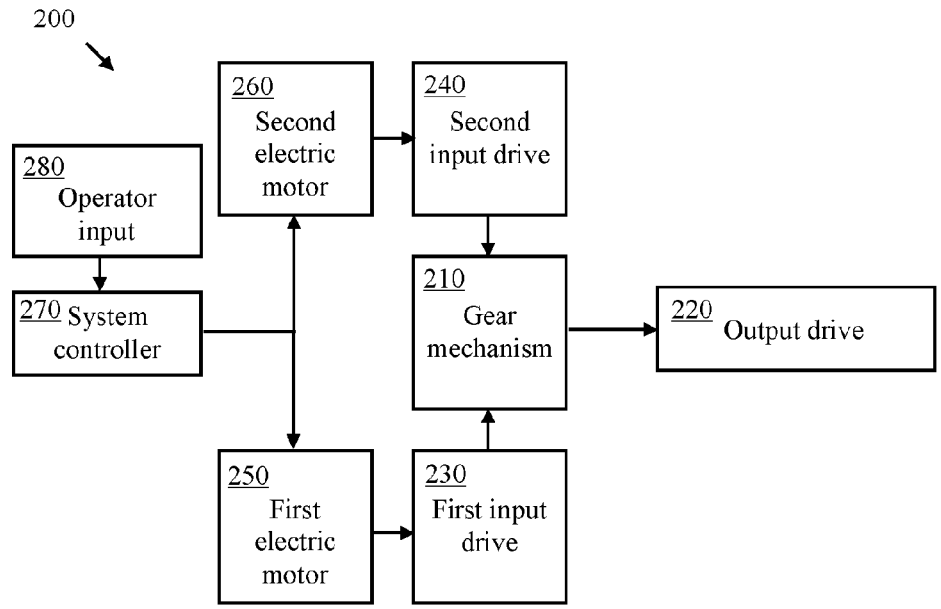
FIG. 3 shows a schematic view of a drive system according to an embodiment of the invention.

Referring to FIG. 3, in one embodiment a drive system 200 comprises a gear mechanism 210 that has an output 220 that is in the form of a single drive shaft, axle, ring, plate, cog or gear that is driven to rotate at an angular speed, $\omega_{out}$. The gear mechanism is connected to a first input drive 230 and a second input drive 240, each in the form of a drive input rotating at an angular speed, $\omega_1$ and $\omega_2$ respectively.

The first input drive 230 and the second input drive 240 are driven by first 250 and second 260 electric motors respectively. In other embodiments there may be three or more input motors, all of which are electric motors. The first and second electric motors are controlled by a system controller 270. In this embodiment, the system controller is arranged to control the speed of the first and second motors individually. The system controller processes an input from the operator 280—the input may be a throttle or other speed controller and determines the required rotation speed of each of the first and second motors to achieve the desired output rotation speed.

In some embodiments a vehicle may be powered by two or more separate drive systems 200, each distinct drive system providing drive for each wheel of the vehicle. In some embodiments a further high-level controller may command and/or receive feedback from the individual system controllers 270. In some embodiments a vehicle may be powered by separate drive systems arranged to provide drive for each wheel individually. Each separate drive system, including its electric motors, and its gear mechanism, is connected directly (or indirectly) to the wheel of a vehicle in order to power the vehicle.

The gear mechanism 210 is arranged such that the output 220 shaft is driven at an angular velocity given by:

$$\omega_{out} \propto a\omega_1 - b\omega_2, \quad (1)$$

where a and b are constants. The value of a and b is determined, amongst other things, by the gear ratios within the gear mechanism, by the ratio selection for the mechanism.

The output velocity is proportional to the difference between the input angular velocities. Therefore, if a>0 and b>0 and the first and second input shafts are arranged to be driven such that $\omega_1$ and $\omega_2$ are positive, the first and second drive inputs effectively act against each other via the gear mechanism. The first and second motors can therefore be controlled to work such that they initially cancel each other out. Even though the first and second motors are working to rotate their respective input shafts, the controller can control their relative work rates (with knowledge of a and b) such that there is no or little effect on the rotation of the output shaft, i.e. $\omega_{out}=0$, or about 0. In a simple example, where a=b, the drive system 200 therefore results in the output shaft rotation speed being proportional to the difference in rotation speed of the first and second inputs, and the output rotation speed may be zero when the rotation speed of both inputs is non-zero.

The inventors have recognised that this technique can solve the problem of providing high torque and low output engine speeds (around $\omega_{out}=0$) without requiring a large input driving current. As is clear from FIG. 1, once the motor has started rotating, the torque will decrease as the rotation speed (angular velocity) increases. It is therefore advantageous to run the motor at a rotation speed that is not near-zero where possible. The present invention allows both motors 250 and 260 to be run at a desired non-zero rotation speed (with a low torque and low current), whilst the output, given by the difference in motor speeds can be zero or low. In this way, the controller can control the first and second motors such that they are made to work in efficient portions of their output profiles (e.g. around 50% of maximum torque or maximum $\omega$—see FIG. 1). When operating at about 50% of its maximum torque, an electric motor with the profile shown in FIG. 1, will be operating at approximately maximum power, but will be drawing a reasonable (not very large) amount of current—as a result, large initial torque output (via the output drive) can be provided without drawing a dangerously (in terms of efficiency, performance, overheating, automatic cut-outs etc.) large current. This is important when the vehicle is pulling away from rest.

Figure 1:
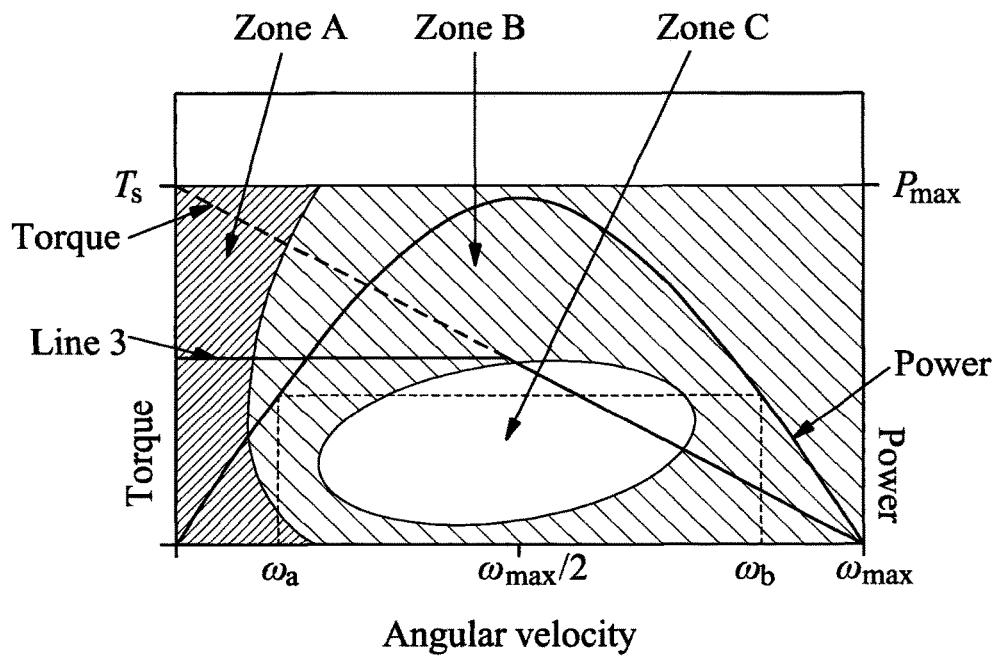
FIG. 1 shows the relationship between angular velocity, torque and power of a typical electric motor.
Figure 2:
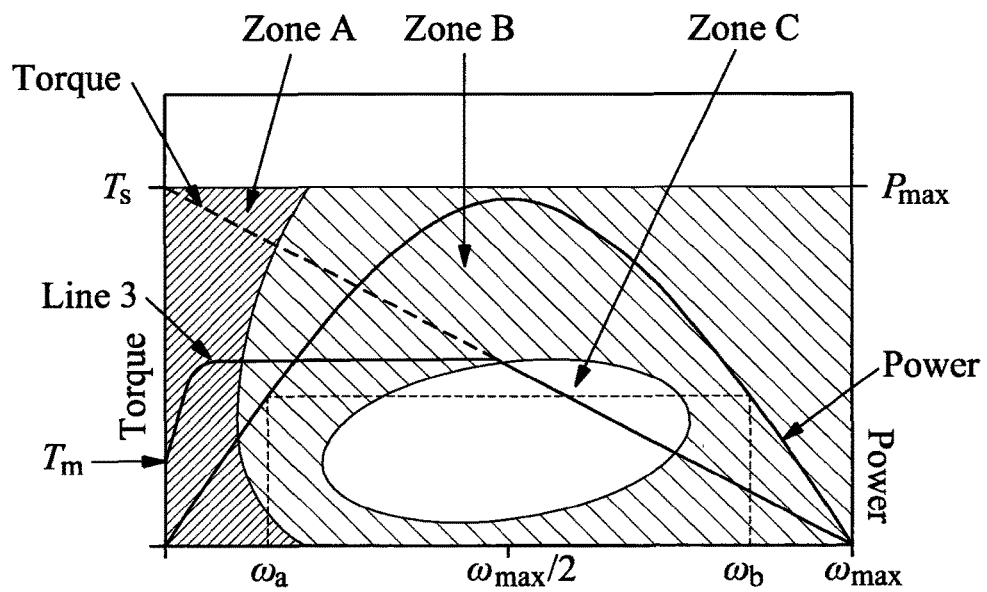
FIG. 2 shows the relationship between angular velocity, torque and power of a second typical electric motor.

The parabolic nature of the relationship between power and angular velocity means that the power will be equal at two different angular velocities, $\omega_a$ and $\omega_b$, during the operating cycle of the motor, as illustrated in FIG. 1. The motor can therefore provide the same amount of power, whilst running at a higher rotation speed, and hence at a lower level of torque and lower current. The controller can be used to make the first and second motors operate in regions of their profiles to achieve a desired output in the region of $\omega_{out} \approx 0$, with a consequent benefit of increased power.

When the vehicle is to be started, both motors begin at rest: $\omega_1 = \omega_2 = 0$. In one example, an operator, for example a human operator, provides an indication that the vehicle should begin to move forward—this can be via a start button, for example. The controller 270 receives the indication. The controller then instructs activation of the first 250 and second 260 electric motors such that they drive the first 230 and second 240 input drive shafts from rest to a rotational speed $\omega_1$ and $\omega_2$ respectively.

The controller controls operation of the motors 250, 260 such that $a\omega_1 = b\omega_2$, i.e. after the motion is transferred through the gear mechanism 210, $\omega_{out}=0$, i.e. the output shaft 220 remains stationary, and the vehicle does not move.

During a first phase, the angular velocities $\omega_1$ and $\omega_2$ are increased until they reach respective primary angular velocities $\omega_{1,p}$ and $\omega_{2,p}$. The primary angular velocity may be a predetermined value at which the first and second motors are known to run sufficiently efficiently. This may be in the region of FIG. 1 where the efficiency of each motor is between 90% and 95%. This may be in the region where the velocity is equal to or around $\omega_{max}/2$, which corresponds to the point where the power delivered by the motor is greatest. In a typical electric motor the optimal angular velocity may be 2500 rpm.

In one example identical first and second motors are used and known to work efficiently at a rotation speed of 2500 rpm. Also, it is assumed, a=b=1, for simplicity. The drive system starts with both motors at rest, and in response to an input from the operator, the rotation speed of both the first and second motors is increased concurrently until $\omega_1=\omega_2=2500$ rpm. This process is controlled by the system controller 270 with no input from the user except the first activation signal. Clearly, in other embodiments, other efficient rpm values will apply. A desired region of operation for an electric motor may be within 20% to 80% of its maximum rotational speed value.

With the motors held at an equal rotation speed, the output drive, and hence the vehicle, will remain at rest. This state of operation may be achieved following a first user action, such as pressing a start button. When the user wishes to start the vehicle in motion, a further input is given to the system controller 270. This input may be in the form of a throttle lever or pedal typical in motorised vehicles, for example. During a second phase, in response to the further user input the system controller 270 reduces the rotation speed of one of the motors (the second motor in this example) whilst the first motor is kept at the original rotation speed (2500 rpm in this example). As the output is proportional to the difference in the motor rotation speeds, the difference will no longer be zero, and the vehicle will begin to move from rest. As the difference in the motor rotation speed increases so does the vehicle speed and the vehicle will accelerate. When the vehicle reaches the desired speed the user may stop the input indicating vehicle acceleration is required, at which point the motors will stop varying in rotation speed and the vehicle speed will remain constant.

Figure 4:
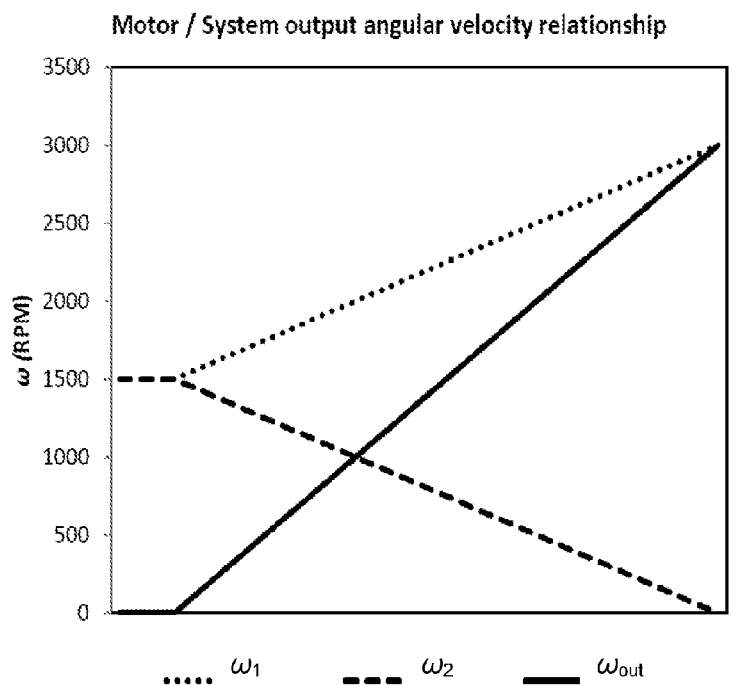
FIG. 4 shows the angular velocity relationship between the inputs and output of a drive system according to an embodiment of the present invention.
Figure 5:
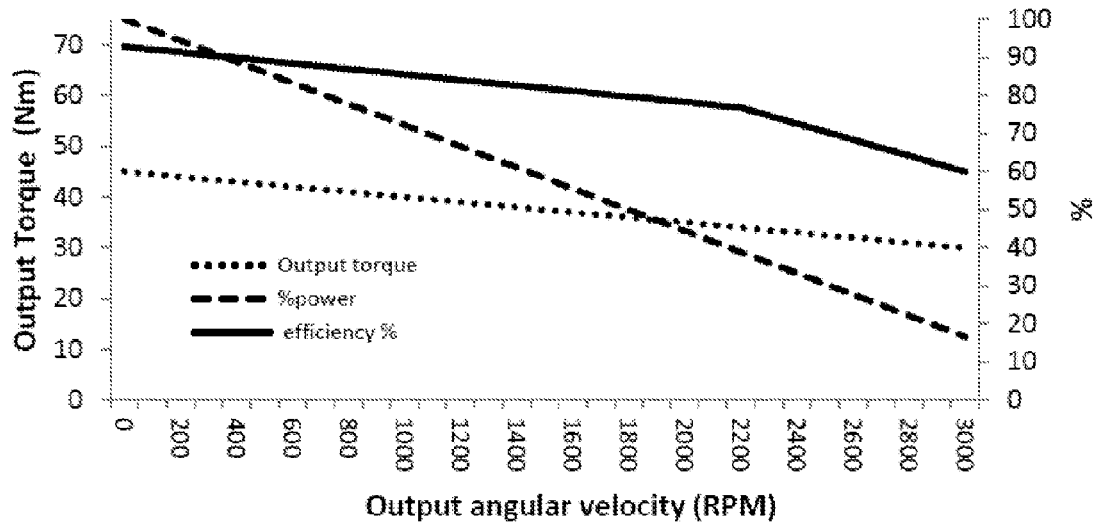
FIG. 5 shows the power and efficiency of a drive system according to an embodiment of the present invention.

FIG. 4 shows a further example in which the initial rotation speed of the first and second motors has been set at $\omega_1=\omega_2=1500$ rpm. With both motors at an equal rotation speed, the output rotation will be zero, and the vehicle will be at rest. The speed of the first motor is then increased from $\omega_1=1500$ rpm to $\omega_1=3000$ rpm. At the same time, the speed of the second motor is decreased from $\omega_2=1500$ rpm to $\omega_2=0$ rpm. The speed of both of the motors is changed at the same rate in this example. FIG. 4 shows the effect this has on the output rotation speed. As the output is equal to the difference of the first and second motors, the output rotation speed increases from zero once $\omega_1 \neq \omega_2$. When $\omega_1=3000$ rpm and $\omega_2=0$ rpm, the output rotation speed is equal to 3000 rpm. The power and efficiency of a drive system according to the example given in FIG. 4 is shown in FIG. 5.

In some embodiments, the entire action described above may be completed by the controller in response to a single user input (such as operation of a throttle, for example). The initiation of the first and second electric motors under the supervision of the controller is quick enough to make this feasible.

In another embodiment, $a\omega_1 \approx b\omega_2$. In this case $a\omega_1$ is substantially equal to $b\omega_2$, and the contributions for the first and second electric motor will not cancel out exactly. This may be due to manufacturing variations between the first and second electric motors, gear mechanism or system controller. In other embodiments, $a\omega_1$ may be equal to $b\omega_2$ within a threshold that may be predefined as a tolerable threshold. Therefore $\omega_{out}$ has a tolerable, perhaps small, non-zero value. The controller is arranged to control operation of vehicle brakes in order to ensure there is no undesired movement of the vehicle at this stage. If $a\omega_1 > b\omega_2$ then the vehicle would be urged to move forward; whilst if $a\omega_1 < b\omega_2$ then the vehicle would be urged to move backward. The vehicle brakes are activated to prevent this, at this stage. The application of the brake prevents the rotation of the output, and will force the input drive from the 'faster' motor to the 'slower' motor, which will have the effect of equalising the speed of both motors. The user can therefore manage vehicle creep before pulling away by the application of the brake. This is similar to the operation of single motor vehicles with automatic gear boxes, where vehicle creep is managed by application of the brake. If the difference in $a\omega_1$ and $b\omega_2$ is tolerable, any vehicle creep can be managed by application of the brakes. The motors will typically stabilise to a condition where $a\omega_1 = b\omega_2$. In an electric system, this is a usually acceptable condition since it generally does not take long for each motor to be driven from rest into or near its zone of optimum efficiency.

In yet another embodiment, if the initial operator instruction is to move forward then the controller controls the motors such that $a\omega_1 \approx b\omega_2$ and $a\omega_1 > b\omega_2$ Therefore, the vehicle may creep forward whilst the motors are being brought into an efficient operating region before pulling away significantly. Similarly, if the initial operator instruction is to move backward then the controller controls the motors such that $a\omega_1 \approx b\omega_2$ and $a\omega_1 < b\omega_2$ Therefore, the vehicle may creep backward whilst the motors are being brought into an efficient operating region before pulling away significantly. It is envisaged that, in some embodiments, due to the quick response time of an electric motor, there will be no significant delay between the 'creeping' and the pulling away—a user of the vehicle does not need to take account of it.

In some embodiments the system uses a first electric motor A, which has its angular velocity controlled to optimise efficiency, range and power for the chosen application, and a second electric motor, B, in which the controller utilises a default matching function to 'match' motor speed of B to A when not receiving any command from the operator. The controller is arranged to drive A to an optimum value, and then is arranged to control the angular velocity of B to match A in order to keep them equal, or substantially equal. Acceleration would in effect result from 'overriding' the default matching function, and controlling the second motor B to provide a desired difference in angular velocity.

In yet further embodiments the system comprises an automatic output brake function for both safety and controllability that can be applied by the system controller with input from the user.

As the output rotation speed is proportional to the difference in the two input motor rotation speeds the drive system can easily and efficiently operate in a regime where the output rotational speed is low (i.e. the vehicle speed is low), yet the torque and hence the current drawn by each motor remains low. This therefore allows the vehicle to operate efficiently at low speeds and with a high torque. Otherwise, it is very difficult to operate a conventional electric powered vehicle at low speed—the large current drawn at low speeds (due to the high torque) usually results in implementation of an automatic cut-out mechanism to prevent overheating or damage to the battery or other components.

In some embodiments, in order to maintain the first and second inputs at equal rotation speeds an additional control system is used. This may be in the form of a feedback mechanism that measures the relative speed of the inputs and adjusts them accordingly to maintain $\omega_{out}=0$. One of the motors may be deemed to be a lead motor, with the second motor arranged to adjust its speed to maintain a zero difference in rotation speed.

In a particularly useful embodiment, the first and second motors are substantially identical. They have substantially the same power profiles and are the same size. Therefore, efficiently, drive requirements can be shared between them to provide for equal wear and tear over time. In this example, the controller may alternately, or from time to time, switch between the motors that it considers to be the first and the second motor.

Figure 6:
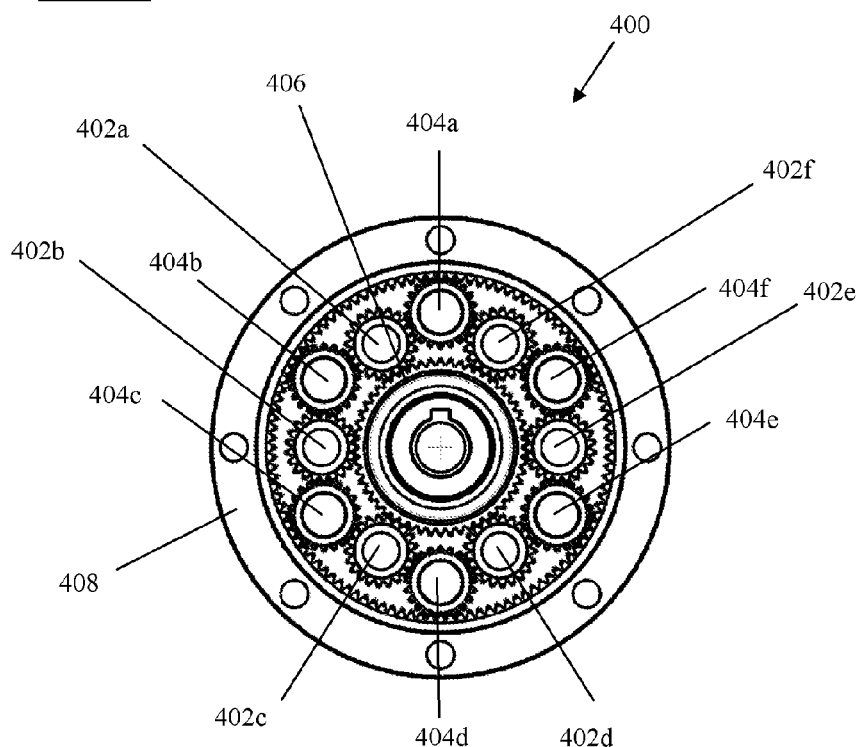
FIG. 6 shows an example epicyclic gear layout.

The gear mechanism of the present invention may be a reverse star compound epicyclic gear layout 400 as shown in FIG. 6. The gear mechanism comprises a first group of six inner planet gears 402a, 402b, 402c, 402d, 402e, 402f arranged around, and meshed with, a central star gear 406. A second group of six outer planet gears 404a, 404b, 404c, 404d, 404e, and 404f are also arranged around the central star gear, but do not mesh with the star gear 406. Each of the second group of planet gears meshes with two of the first group of plant gears. Around the second group of planet gears is a ring gear 408, which meshes with each of the second group of planet gears 404a, 404b, 404c, 404d, 404e, 404f.

In other embodiments there may be only one group of planet gears each meshed with both the star gear and ring gear. In some embodiments the number of planet gears in each group may be more than six. In some embodiments the number of planet gears in each group may be less than six.

Figure 7:
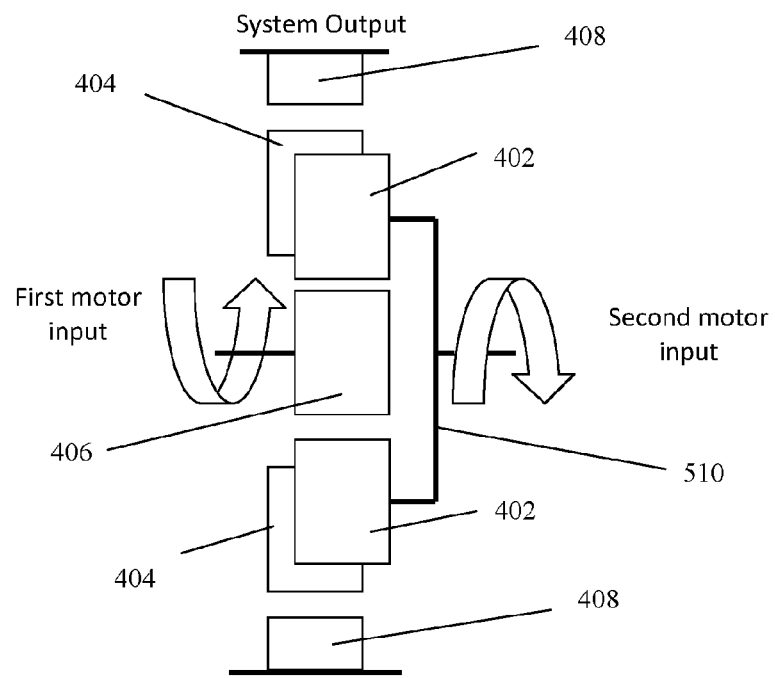
FIG. 7 shows a schematic view of the gear mechanism of the present invention.

The gear mechanism 210 of the present invention is shown schematically in FIG. 7, with common components from FIG. 6 given the same labels. In this case the inputs and output from the gear mechanism are also shown. Referring to FIG. 7, the star gear 406 is connected to the first input drive 230. Around the star gear are the first group 402 and second group 404 of planet gears. The first group of planet gears are connected via a planet gear carrier 510. The axis of rotation is held in a fixed position relative to the planet gears, but each of the planet gears are themselves free to rotate. The planet gear carrier 510 forms a second input to the gear mechanism and is connected to the second input drive. The output of the system is the ring gear 408, which is connected to the wheels of a vehicle being driven by the system.

Figure 8:
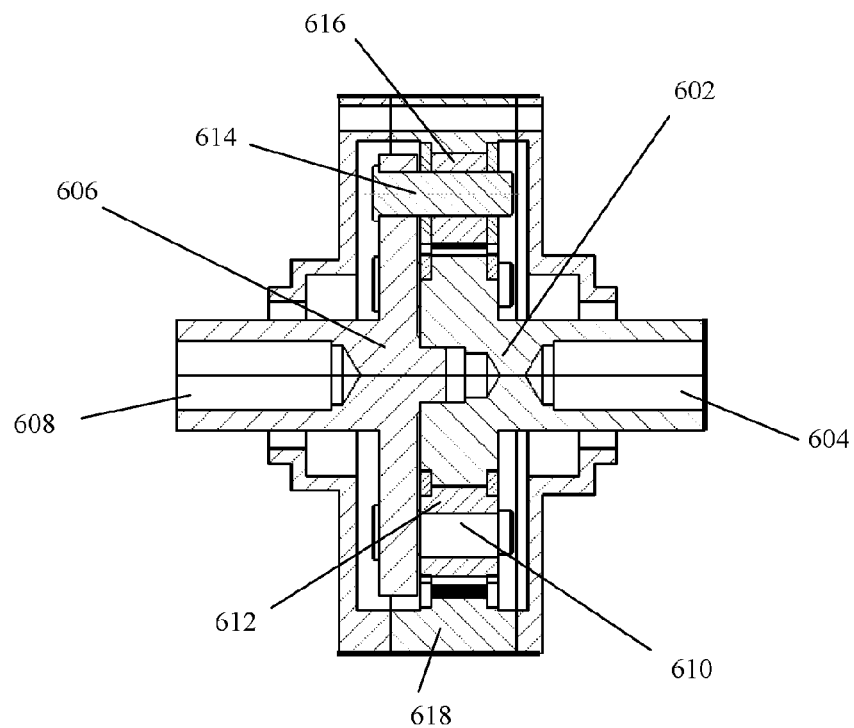
FIG. 8 shows a side view of the gear mechanism of the present invention.

FIG. 8 shows a detailed side view of the gear mechanism 210 of the present invention. The gear mechanism comprises a central star gear 602 which has an aperture 604 arranged to receive a shaft or axle. The shaft or axle provides a first input, from the first electric motor, to the gear mechanism. The first input therefore drives the star gear. The gear mechanism further comprises a planet gear carrier 606 which is arranged to rotate concentrically with the star gear. The planet gear carrier has an aperture 608 arranged to receive an axle or shaft in order to drive the planet gear carrier. This axle or shaft forms the second input to the gear mechanism and is driven by the second electric motor. The second input therefore drives the planet gear carrier.

The first group of planet gears 402 are attached to the planet gear carrier by means of axles, one of which 610 is shown in FIG. 8. The axle 610 is rigidly fixed to the planet gear carrier, but in some embodiments may be free to rotate. FIG. 8 shows one of 612 the first group of planet gears 402, which rotates about the axle 610. The planet gear 612 is meshed with the star gear 602 and so drive is transferred from the star gear to the planet gear 612. The second group of planet gears 404 are similarly mounted to the planet gear carrier. One of 616 the second group of planet gears 404 is shown in FIG. 8 mounted to the planet gear carrier via axle 614. The planet gear 616 is meshed with one of the first group of planet gears (not shown in FIG. 8) and with the ring gear 618. Drive is therefore transferred from the first group of planet gears to the ring gear, via the second group of planet gears. The use of two groups of planet gears reverses the direction of the star gear such that it rotates in the same direction as the ring gear.

In the reverse-star full-complement planetary-epicyclic embodiment (shown in FIG. 6) the outer planet gears (404) may be mounted onto a drive carrier, or may be retained in position by their meshed location and side guides. Such side guides comprise recesses in the housing of the gear mechanism in which the planet gears may be located. The planet gears are held in place by the side guides without the need of a planet gear carrier. In the design shown in FIGS. 6 and 9, the outer planets are not carrier mounted, in the design shown in FIG. 7 both the inner and outer planet are carrier mounted.

Figure 9:
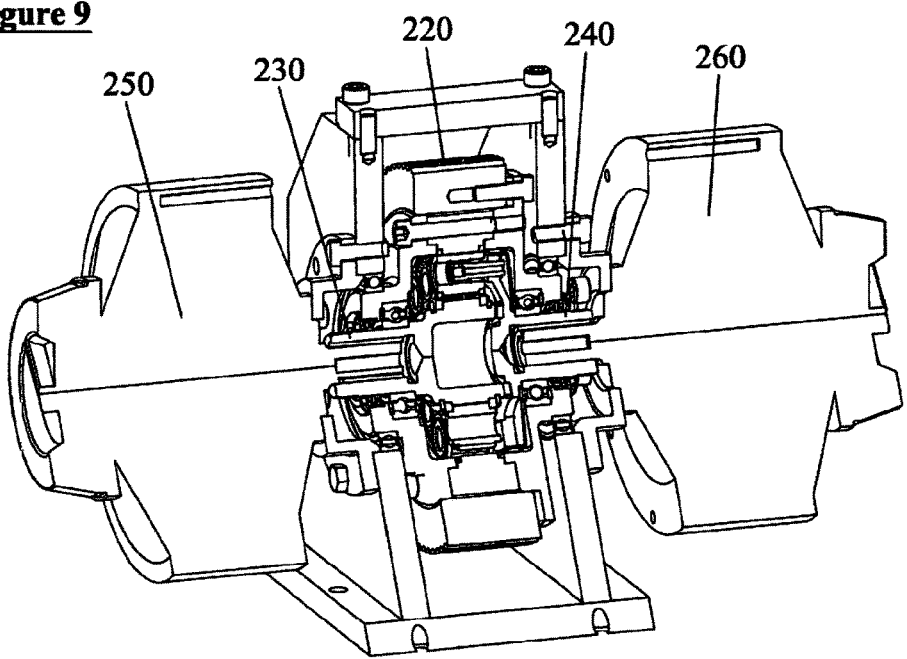
FIG. 9 shows a cut away view of the drive system of the present invention.

The drive system 200 is shown in FIG. 9 labelled to correspond to FIG. 3. The first electric motor 250 is shown driving the first input drive 230. The second electric motor 260 is shown driving the second input drive 240. The output drive 220 is also shown.

Figure 10:
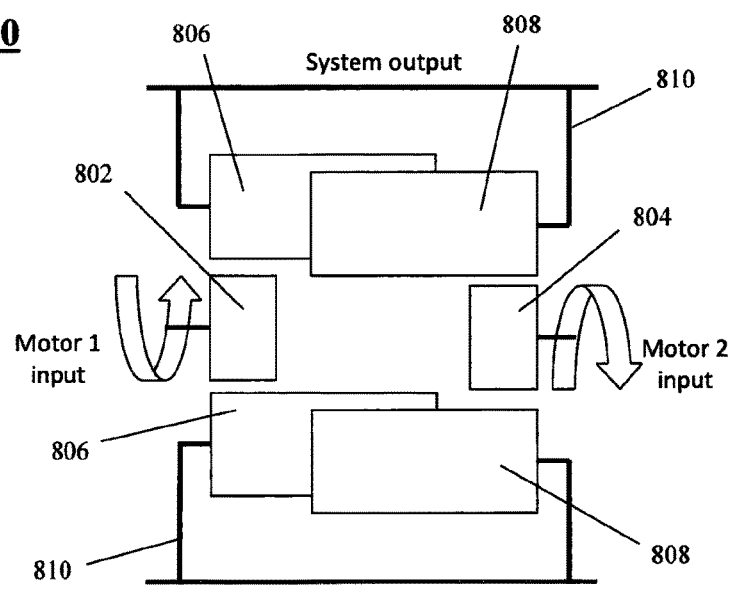
FIG. 10 shows a schematic view of an alternative gear mechanism of the present invention.

In other embodiments the gear mechanism may be a double star compound epicyclic layout (also known as a spur gear differential, spur gear axial differential, helical gear differential, helical gear axial differential, or axial differential) as shown schematically in FIG. 10. The double star planetary layout comprises a first 802 and second 804 star gear. The first star gear 802 forms the first input drive and is driven by the first electric motor. The second star gear 804 forms the second input drive and is driven by the second electric motor. The first and the second star gears both rotate around the same axis. The first star gear 802 is meshed with a first group of planet gears 806. In FIG. 10 two of the first group of planet gears are shown, but it is to be understood that there can be any suitable number. The second star gear 804 is meshed with a second group of planet gears 808. Again in FIG. 10 two of the second group of planet gears are shown, but it is to be understood that there can be any suitable number. Each of the first and second groups of planet gears are arranged to mesh with one another to link both of the star gears to the output. The output of the mechanism in FIG. 10 is the planet gear carrier 810, which is fixed to both groups of planet gears.

Figure 11:
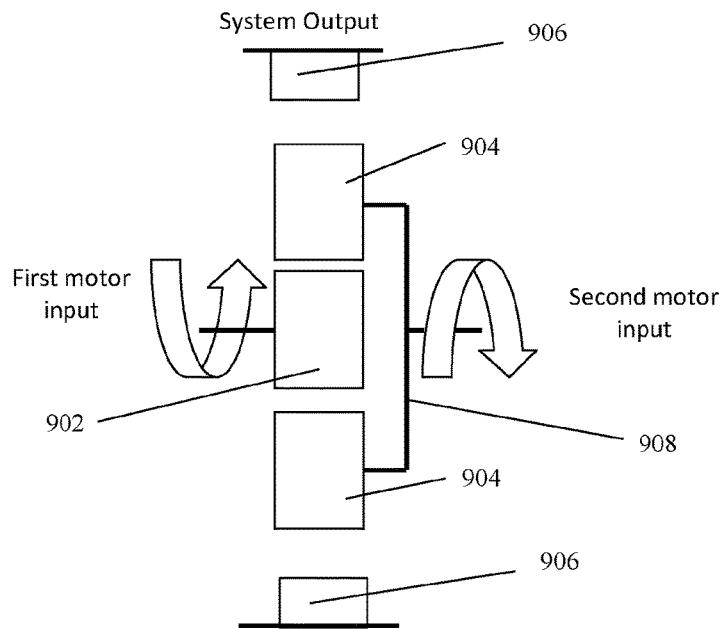
FIG. 11 shows a schematic view of an alternative gear mechanism of the present invention.

In yet another embodiment shown in FIG. 11, the gear mechanism is a simple epicyclic layout. In this embodiment the gear mechanism comprises a single central star gear 902, which is surrounded by a single group of planetary gears 904. Each one of the group of planetary gears meshes with the star gear, and with the surrounding ring gear 906. The first input drive is arranged to rotate the star gear 902 and the second input drives the planet gear carrier 908 which is fixed to the planet gears. The output drive is formed by the ring gear, which is connected to the wheels of the vehicle.

In yet other embodiments the gear mechanism may be a bevel gear differential or a spur gear mechanism.

The design of the gear mechanism includes considerations for wear and bearing performance. This system includes features and devices to ensure that sufficient lubrication is provided to the system during all behaviours. Generally, when $\omega_{out}=0$, or $\omega_{out}\approx 0$, the gears within the gear mechanism will be rotating at relatively high speeds. The components of the gear mechanism in this invention will be subject to high centrifugal forces, compared to a 'standard' epicyclic gear system when used normally. The inventor has realised that this is a problem particular to this invention. This is the normal condition that occurs during system idle and at the start of each operation. In order to solve this problem, in some embodiments there is provided a lubrication system. The lubrication system ensures that sufficient lubrication is provided to the gears during this operating behaviour. In addition, the lubrication system ensures that when $\omega_1 \neq \omega_2$ and $\omega_0 > 0$ the centrifugal force experienced by the gear mechanism will not starve the star gear of lubrication. The design of the gearbox includes deflectors; bearing surfaces and machined features to direct lubrication to the star gear and carrier contact area, to the teeth of the star gear, to the mounting spindles and sides of the inner planet gears, to the sides and teeth of the outer planet gears, and to the ring gear of the gearbox. In some embodiments the input drives utilise sealed and pre-lubricated roller bearings to maintain effective lubrication.

The lubrication system has been described in conjunction with an epicyclic gear mechanism. Particularly high centrifugal forces are experienced using this invention with such gear mechanisms. However, the lubrication system in other embodiments may be useful with other types of gear mechanism to avoid similar problems caused by high centrifugal forces.

The drive system of the present invention is particularly useful in situations where a high torque is required at a low output rotation speed. This may be the case in off-road vehicles where a high level of torque is required to traverse over difficult terrain. The present invention also provides improved speed control at low vehicle speed and at a high torque. This may be important in vehicles such as agricultural machines (such as tractors) where equipment is pulled or dragged at a low speed across difficult terrain.

The present drive system is also suitable for use in applications such as: military vehicles, construction equipment and road vehicles of moderate to high mass particularly those having high stop/start duty cycles (such vehicles include: delivery vehicles, buses, trams, electric railway vehicles or trains, etc.). It may be particularly useful in autonomous vehicles, such as agricultural and military vehicles, where accurate control of the speed is required at low vehicle speeds.

Various modifications will be apparent to the skilled person without departing form the scope of the claims. Alternative embodiments of the present invention are shown in FIGS. 12 to 17, which show variations on the drive system of FIG. 3. Components common to each of the figures are labelled accordingly.

Figure 12:
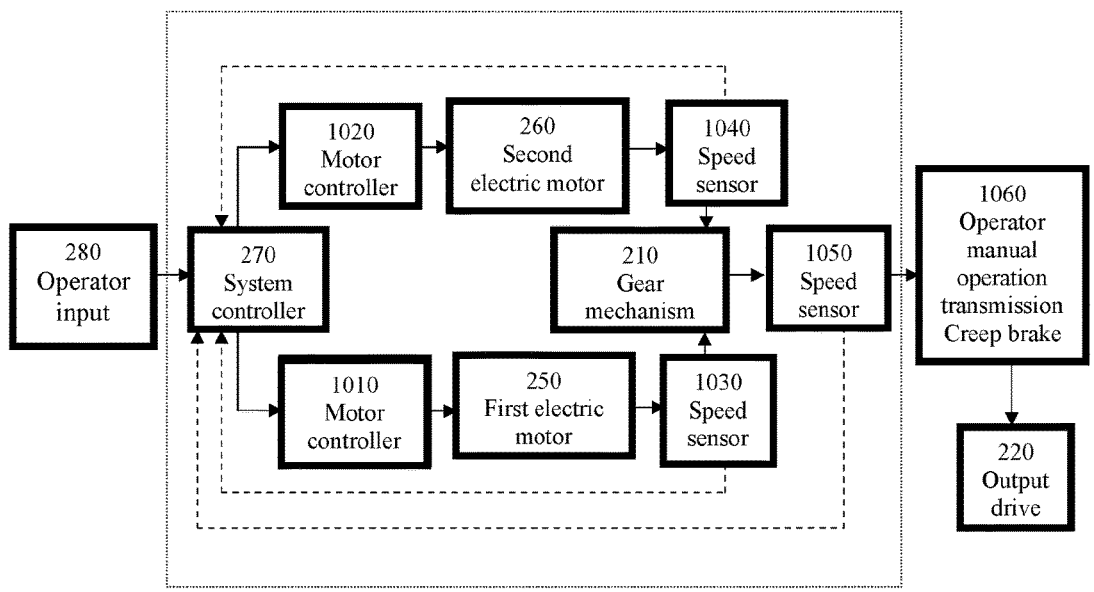
FIG. 12 shows a drive system according to a second embodiment of the present invention.

In FIG. 12 the first electric motor 250 is controlled by a motor controller 1010 and the second motor 260 is controlled by motor controller 1020. The motor controllers are each individually controlled by the system controller 270. The drive system further comprises a first speed sensor 1030 arranged to monitor the angular velocity of the first electric motor 250, a second speed sensor 1040 arranged to monitor the angular velocity of the second electric motor 260 and a third speed sensor 1050 arranged to measure the angular velocity of the gear mechanism output. The system controller is arranged to receive signals from each of the speed sensors 1030, 1040, 1050 and relay signals to the motor controllers 1010 and 1020 in order to control the angular velocity of the first and second electric motors. During the first phase, i.e. before the vehicle has moved from rest, the system controller may be arranged to control the angular velocity of the first electric motor, the second electric motor or both such that $a\omega_1$ and $b\omega_2$ are brought closer to being equal. The controller may be further arranged to, again during the first phase, to determine whether $a\omega_1 = b\omega_2$ and if it is determined that $a\omega_1 \neq b\omega_2$, the controller may be arranged to control the angular velocity of the first electric motor, the second electric motor or both such that $a\omega_1$ and $b\omega_2$ are brought closer to being equal. In some embodiments the third speed sensor arranged to measure $\omega_{out}$ and communicate its value to the controller, and during the first phase the controller may be arranged to control the first, second or both electric motors so that $a\omega_1$ and $b\omega_2$ are brought closer to being equal. The drive system further comprises a transmission creep brake 1060 which may be operated by the user to prevent the vehicle creeping before it pulls away. In some embodiments the transmission creep brake may be an automatic feature under the control of the system controller.

Figure 13:
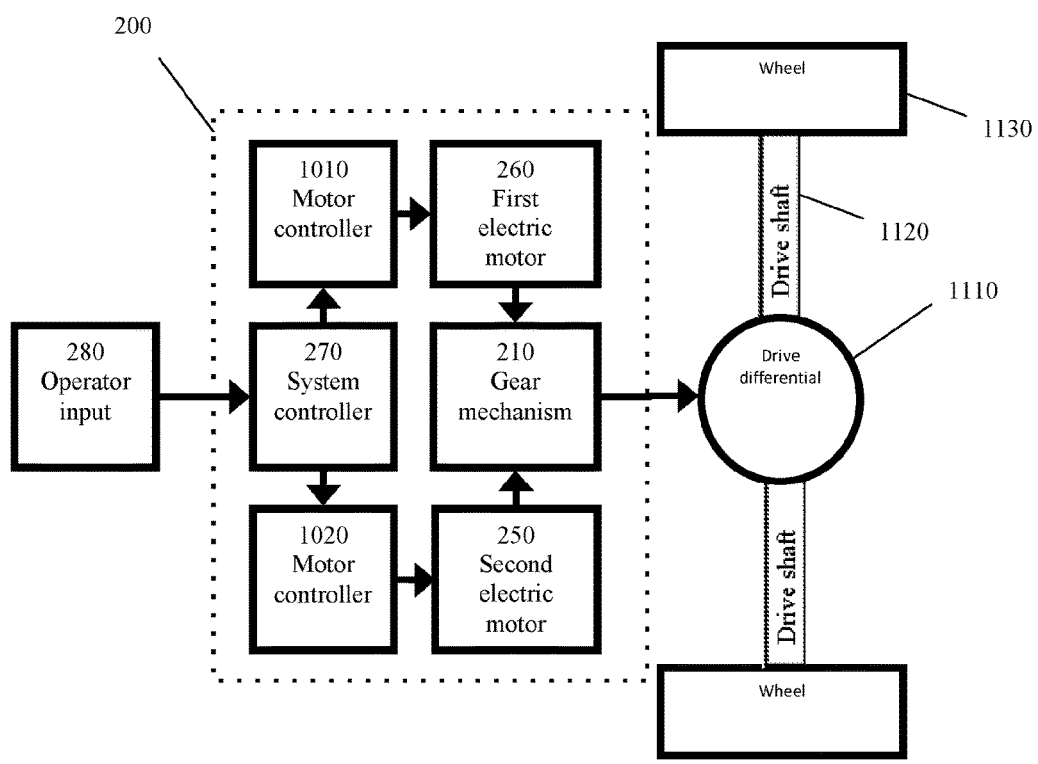
FIG. 13 shows a drive system according to a third embodiment of the present invention.

FIG. 13 shows an embodiment where the output of the gear mechanism 210 is connected via a differential 1110 to a drive shaft 1120. The wheels 1130 of a vehicle to be driven by the drive system are connected to the drive shaft such that the drive system may drive the vehicle.

Figure 14:
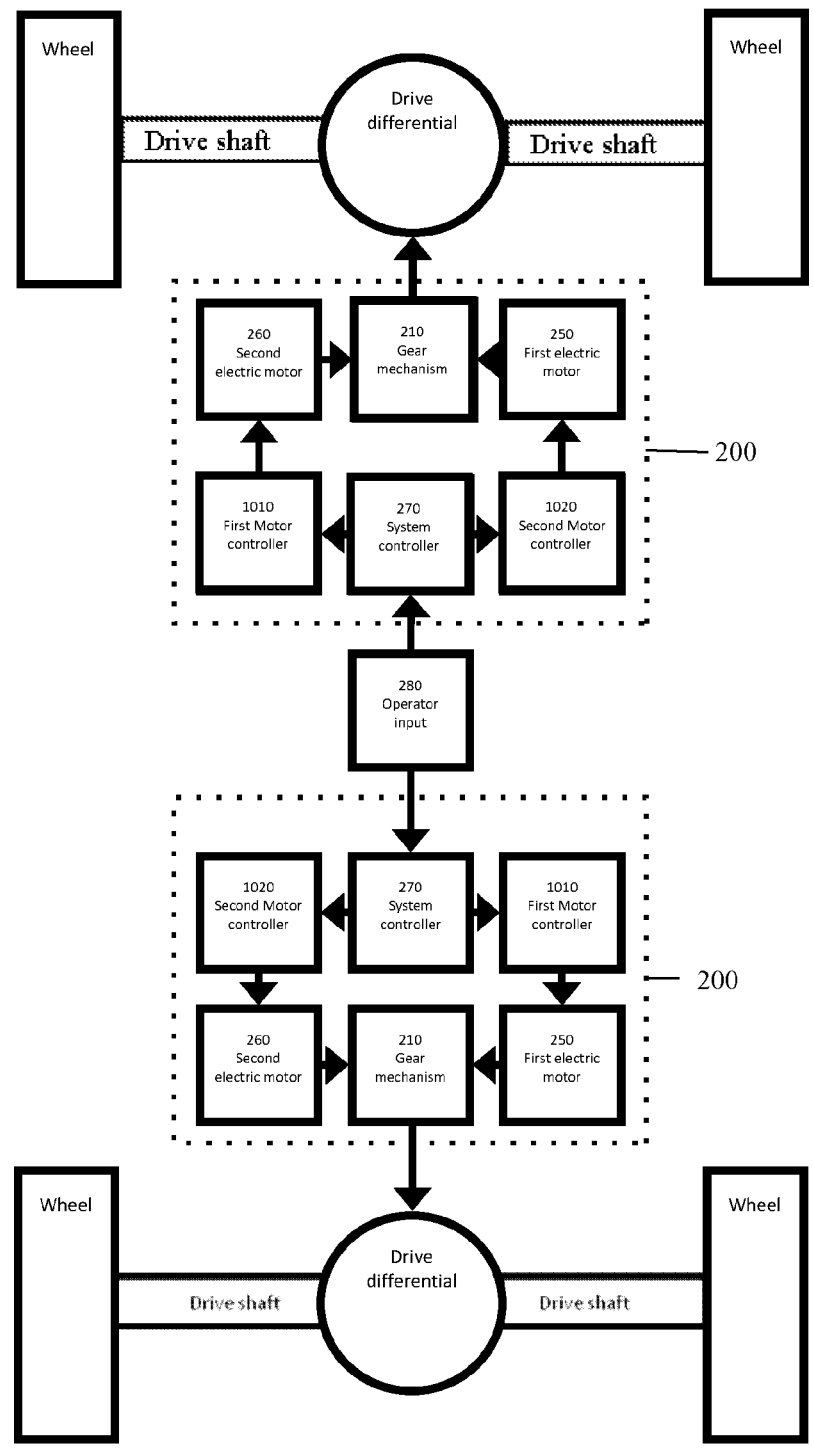
FIG. 14 shows a drive system according to a fourth embodiment of the present invention.

FIG. 14 shows an embodiment of the invention where a vehicle is driven by two drive shafts, with two wheels mounted on each. Each of the two drive shafts is connected via a differential to a drive system of the present invention. The operator input is arranged to control each of the drive systems independently or separately in order to drive the vehicle. The operator is also able to operate both system controllers to achieve either the same speed or different speeds for each of the vehicle wheels so that a variable control of wheel slip can be managed providing traction control for the vehicle. This is of particular value in off-road vehicles operating on difficult terrain where wheel slip is more likely to be encountered.

Figure 15:
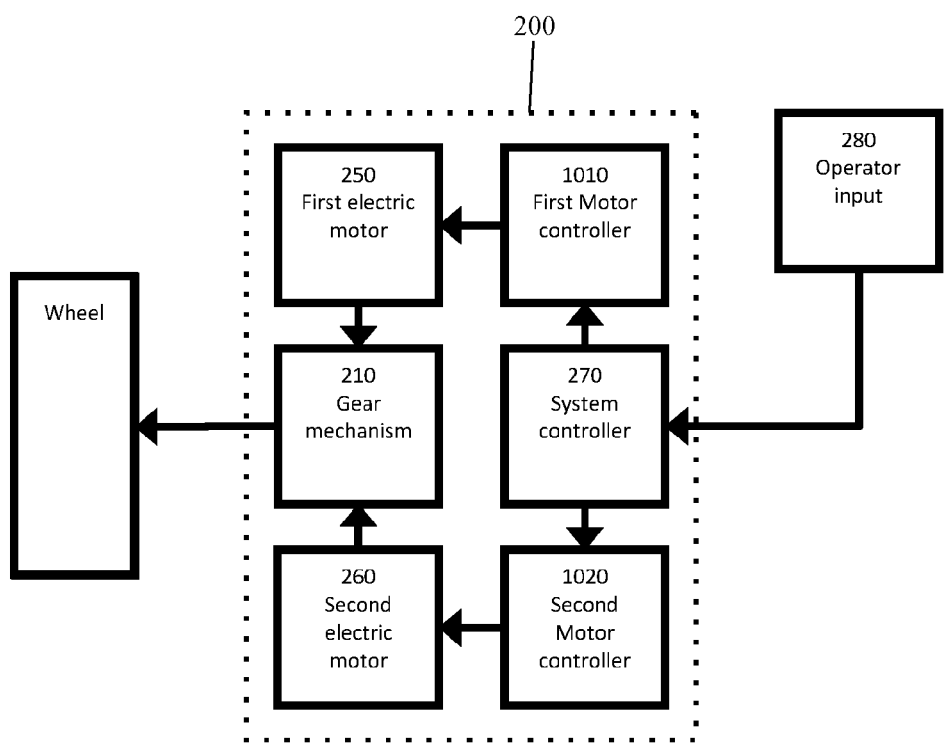
FIG. 15 shows a drive system according to a fifth embodiment of the present invention.
Figure 16:
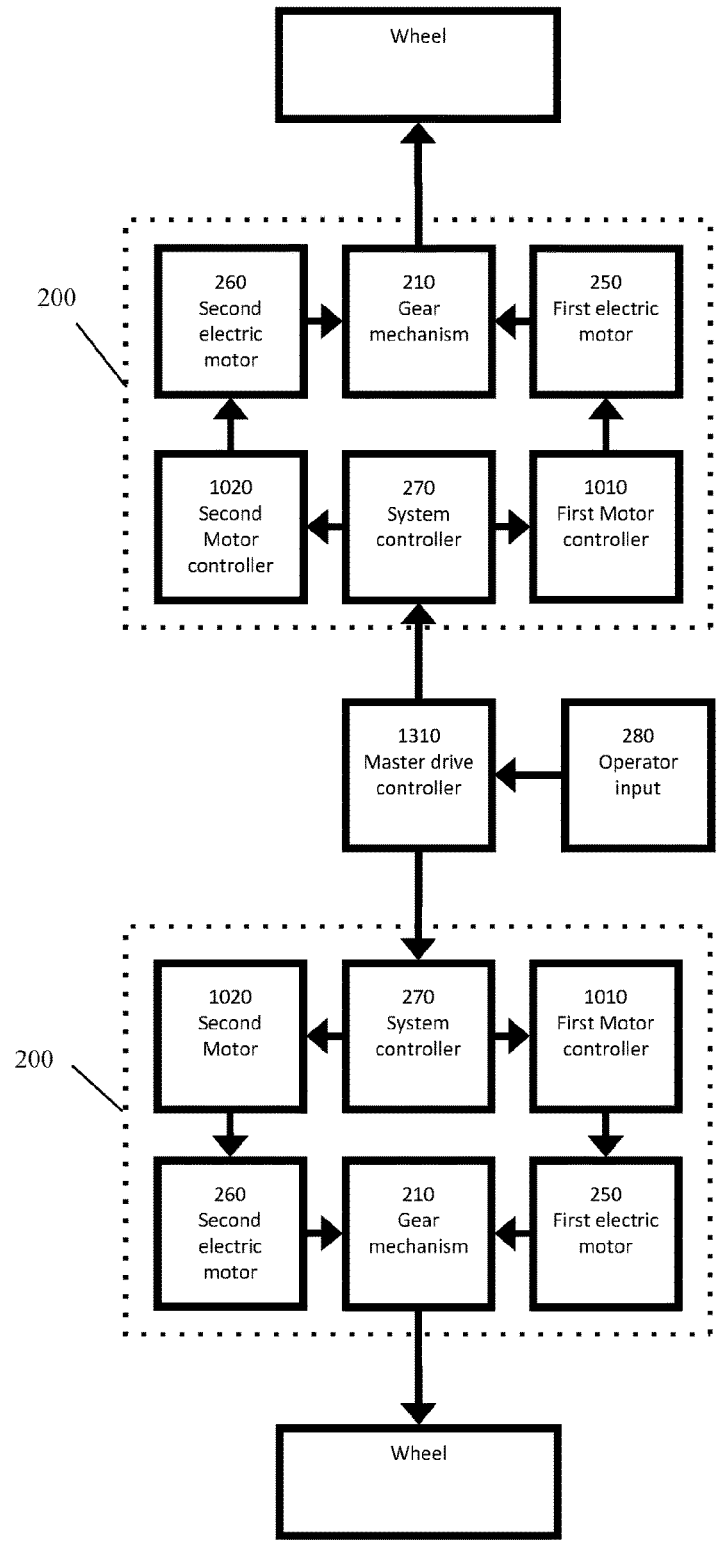
FIG. 16 shows a drive system according to a sixth embodiment of the present invention.
Figure 17:
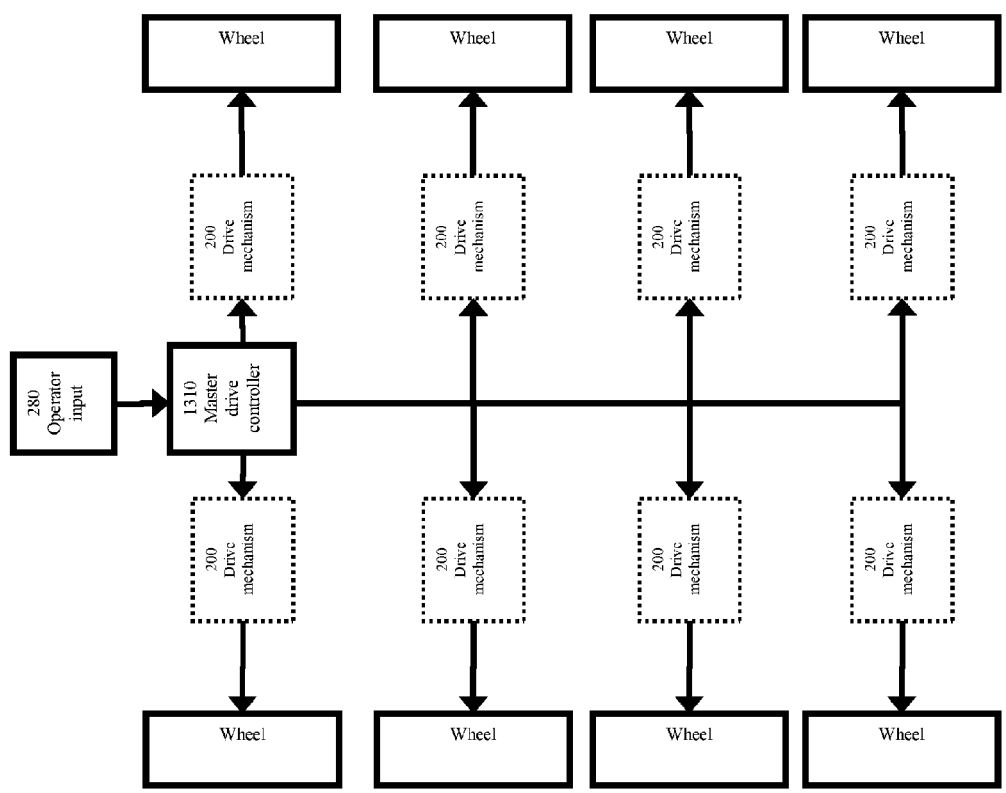
FIG. 17 shows a drive system according to a seventh embodiment of the present invention.

FIG. 15 shows an embodiment of the present invention where the output of the gear mechanism is connected directly to a wheel of a vehicle being powered by the drive system. A single wheel is therefore driven directly by the drive system without a differential. The arrangement of FIG. 15 can be extended to provide two drive systems each with a single wheel attached to the output, as shown in FIG. 16. This can be mounted on a vehicle and will act as a drive shaft with a wheel at each end, except that the wheel speeds can be controlled independently of each other. A master drive controller 1310 is arranged to receive signals from the user to drive the wheels and power the vehicle. This arrangement can be extended to a vehicle with any number of driven wheels as shown in FIG. 17. Each wheel is driven by a drive system 200 and each can be controlled independently by a master controller which receives signals from the user input. These embodiments provide the advantage that the drive to each wheel can easily be controlled independently which can allow improved torque vectored steering and traction management.

In some embodiments the drive system 200 may be mounted in a self contained unit comprising a single input which is arranged to receive signals from a user interface in order to control the unit, and an output comprising a single shaft that may be connected directly to a wheel of a vehicle. The drive system of the present invention can be made small and light so that it can be conveniently packaged into a single unit.

In summary, the present invention provides an electric drive system that allows efficient operation at or around zero output velocity by use of a gear mechanism which allows both input motors to run at an efficient angular velocity. By ensuring both input motors always operate in a region where their output angular velocity is non-zero, the efficiency and power delivered by the motors is maximised, whilst significantly reducing the likelihood of stalling. This is especially important in relation to off-road vehicles where there is a large rolling resistance and so a large torque is required for the vehicle to pull away from rest. In prior art systems this requires a large torque output from the motors and so a large current is drawn, thus reducing the efficiency and range of the vehicle and increasing the likelihood of the vehicle stalling.

The invention claimed is:

1. An off-road vehicle electric clutch-less drive system, comprising:
a first electric motor arranged to drive a first input shaft at a first angular velocity, $\omega_1$;
a second electric motor arranged to drive a second input shaft at a second angular velocity, $\omega_2$;
a gear mechanism arranged to transmit angular rotation of the first and second input shafts to drive an output of the electric drive system at an output angular velocity, $\omega_{out}$, such that $\omega_{out}$ is proportional to $a\omega_1 - b\omega_2$, where a and b are constants; and
a controller arranged to control operation of the first and second electric motors, wherein when the output is to be driven from $\omega_{out}=0$, the controller is arranged to control the first and second electric motors to drive the first and second input shafts:
in a first phase to primary first and second angular velocities, $\omega_{1,p}$ and $\omega_{2,p}$, such that $a\omega_{1,p} \approx b\omega_{2,p}$ and
in a second phase subsequently to vary the first angular velocity, $\omega_1$, or the second angular velocity, $\omega_2$, or both such that $a\omega_1 \neq b\omega_2$ and the output is driven from $\omega_{out}=0$,
wherein the controller is arranged to control operation of the first and second electric motors to optimize power delivered to the output.

2. The electric drive system of claim 1 wherein the controller is arranged to control the first and second electric motors to drive the first and second input shafts to the primary first and second angular velocities such that $a\omega_{1,p}=b\omega_{2,p}$.

3. The electric drive system of claim 2 wherein each of the primary first and second angular velocities is between 20% and 80% of $\omega_{max}$.

4. The electric drive system of claim 1 wherein each of the primary first and second angular velocities is substantially greater than 10% of $\omega_{max}$, where $\omega_{max}$ is the maximum angular velocity of each motor and input shaft pair.

5. The electric drive system of claim 1 wherein the controller is arranged to control the rate of rotation of the first and second motors in response to user input.

6. The electric drive system of claim 1 further comprising a sensing system arranged to measure $\omega_1$ and $\omega_2$ and to communicate the measurements to the controller, such that in the first phase the controller is arranged to control the first, second or both electric motors so that that $a\omega_1$ and $b\omega_2$ are brought closer to being equal.

7. The electric drive system of claim 6 wherein the controller is arranged to determine whether $a\omega_1=b\omega_2$, and if it is determined that $a\omega_1 \neq b\omega_2$, the controller being further arranged to control the first, second or both electric motors so that $a\omega_1$ and $b\omega_2$ are brought closer to being equal.

8. The electric drive system of claim 6 wherein the sensing system comprises a first sensor arranged to measure $\omega_1$ and a second sensor to measure $\omega_2$.

9. The electric drive system of claim 1 further comprising a third sensor arranged to measure $\omega_{out}$ and communicate its value to the controller, in the first phase the controller being arranged to control the first, second or both electric motors so that $a\omega_1$ and $b\omega_2$ are brought closer to being equal.

10. The electric drive system of claim 1 wherein the gear mechanism comprises a lubrication system arranged to operate under high centrifugal forces.

11. The electric drive system of claim 10 wherein the lubrication system comprises a deflector or bearing surface arranged to direct lubricant.

12. The electric drive system of claim 1 wherein the gear mechanism is an epicyclic gear system.

13. A vehicle comprising the electric drive system of claim 1.

14. A vehicle wheel comprising the electric drive system of claim 1 mounted thereon.

15. The electric drive system of claim 1, wherein the controller is arranged to maximize power delivered to the drive output.

16. The electric drive system of claim 1 wherein each of the primary first and second angular velocities is substantially non-zero.

* * * * *